Feb. 14, 1950
W. M. BRANTLEY
2,497,254
ATTACHABLE FULCRUM FOR DENTAL FORCEPS
Filed Sept. 29, 1947
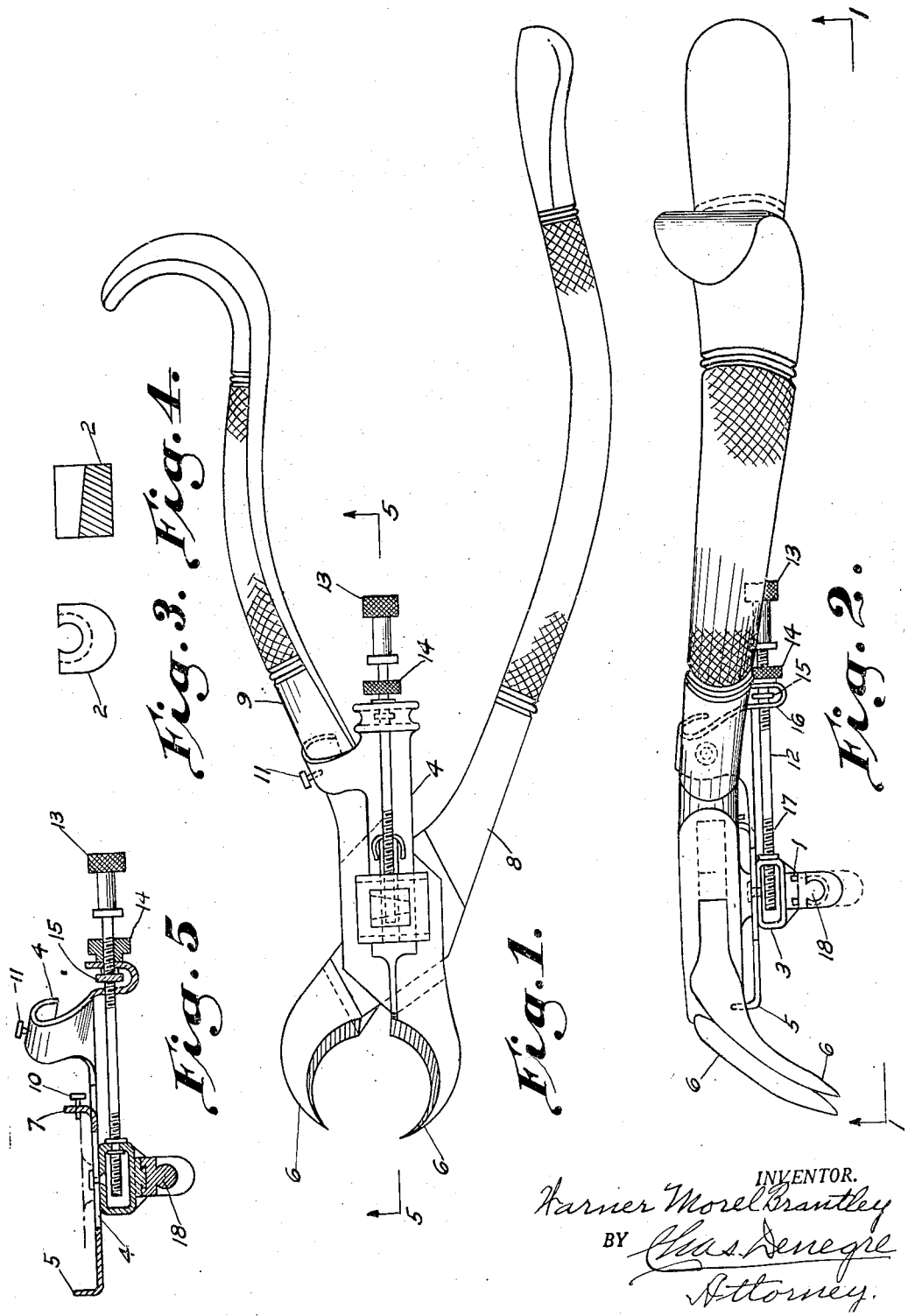
INVENTOR.
Warner Morel Brantley
BY Chas Denegre
Attorney.

Patented Feb. 14, 1950

2,497,254

UNITED STATES PATENT OFFICE 2,497,254

ATTACHABLE FULCRUM FOR DENTAL FORCEPS

Warner Morel Brantley, Birmingham, Ala.

Application September 29, 1947, Serial No. 776,755

1 Claim. (Cl. 32—62)

This invention relates to an attachable fulcrum assembly for use on regular dental forceps. The main object of the invention is to provide forceps with an attachable and adjustable fulcrum which can be seated upon the tooth or teeth adjacent the molar to be removed so that when the tooth is grasped by the jaws of the forceps a gradual pressure or force on the handles will unseat and pull the tooth in its socket to thus be easier removed.

Further objects are to provide such a device that will be highly efficient for its purpose, simple in structure, cheap to manufacture, easily attachable and removable from standard dental forceps now in general use, and not liable to get out of order. Other objects and advantages will appear from the drawing and description.

By referring to the drawing part of this application, it will be observed that Fig. 1 is a bottom plan view looking upward on line 1—1 of Fig. 2 showing the attachable fulcrum assembly mounted on regular dental forceps; Fig. 2 is a side view of Fig. 1; Fig. 3 is an enlarged end view of the fulcrum extension member; Fig. 4 is an enlarged sectional view of the extension member through the center thereof; Fig. 5 is a side view part in section on line 5—5 of Fig. 1 showing the fulcrum assembly off of the forceps.

Similar reference numerals refer to similar parts throughout the several views.

Referring to the drawing in detail it will be seen that the device comprises a fulcrum consisting of fixed and removable portions 1 and 2 carried on a support 3 that is slidable in a main bracket 4 that fits with its front end 5 between the jaws 6 of the forceps with the rear end 7 of that part of the bracket inserted between the handles 8 and 9 of the forceps. The rear end is provided with a set screw 10 to take care of variations in the sizes of forceps. The bracket is also provided with a set screw 11 in its curved arm portion to hold the assembly firmly attached to the forceps. Mounted in the main bracket there is an adjusting long screw 12 with a head 13 and a jam nut 14 and a collar 15 that is free on the screw between the loop portion 16 of the bracket. The end 17 of the screw fits into a threaded hole in the slidable fulcrum support so that it can by manual operation move the fulcrum forward or backward on the main bracket. The extension member of the fulcrum as shown by Figs. 3 and 4 is for increasing the height of the fulcrum by attaching to the fixed part of the fulcrum that is carried on the slidable support thereof. The extension is adapted to fit upon the round base portion 18 of the fixed fulcrum. Different lengths and shapes of the extension may be attached in the same way. A longer extension is indicated by lower broken lines in Fig. 2.

From the foregoing it will appear that in order to use the fulcrum assembly it is first attached to the forceps as shown in Figs. 1 and 2 with its set screws properly adjusted to hold it firmly in place. Then by manual operation of the long adjusting screw the fulcrum is placed at the proper position to secure the leverage force required for extracting the tooth by the operator. After the fulcrum is placed properly the jam nut on the screw is tightened to thus prevent the long screw from revolving.

The various parts of the fulcrum assembly may be made of any material suitable for the purpose but I prefer to use high quality metal with nickel or similar finish thereon. Also the assembly may be made in different sizes.

While I have shown and described the preferred embodiment of my invention, I do not wish to limit same to the exact and precise details of structure, but reserve the right to make all modifications and changes so long as they remain within the spirit and scope of the following claim.

Having described my invention I claim:

An attachable fulcrum assembly for use on dental forceps of the class described comprising; a main bracket having two upturned ends, a set screw in one upturned end, a portion of the bracket formed as a loop, a set screw in said loop portion, a base portion of the bracket with a slot therein, a smaller supporting bracket slidably mounted on the base portion of the main bracket, a fulcrum member removably attached to the smaller slidable bracket; an extension depending from and integral with the main bracket, a comparatively long adjusting screw mounted through the depending extension and the slidable smaller bracket, a jam nut mounted on said adjusting screw, a head on said screw for manual operation thereof.

WARNER MOREL BRANTLEY.

REFERENCES CITED

The following references are of record in the file of this patent:

UNITED STATES PATENTS

| Number | Name | Date |
| --- | --- | --- |
| 15,215 | Batchelder | July 1, 1856 |
| 733,114 | Anderson | July 7, 1903 |
| 1,762,888 | Roberts | June 10, 1930 |